UNITED STATES PATENT OFFICE 2,257,009

ORGANIC VANADIUM ESTERS

William H. Hill, Stamford, Conn., assignor to American Cyanamid Company, New York, N. Y., a corporation of Maine No Drawing. Application November 18, 1939, Serial No. 305,174

8 Claims. (Cl. 260—429)

This invention relates to esters of mono and polyhydric ether alcohols and vanadic acids.

Vanadium compounds such as vanadium pentoxide have been used extensively as solid oxidation catalysts in a great many reactions, for example converting sulfur dioxide to trioxide, sugar to oxalic acid, naphthalene to phthalic anhydride, anthracene to anthraquinone. Many of the above reactions are carried out in the vapor phase in which a gaseous mixture of the reacting substances is passed over the vanadium pentoxide. In this type of reaction it is important that the temperature be controlled within a certain range. If the temperature rises too high complete combustion takes place to an increasing extent and the yields are correspondingly lower. Many of these disadvantages are avoided by liquid phase oxidations. The conditions under which these oxidations are carried out in general are more easily controlled than the vapor phase oxidation reactions. However, the vanadium compounds generally available heretofore have not been soluble in organic liquids and hence could not be used effectively in liquid phase oxidation reactions.

According to the present invention various vanadic esters of ether alcohols are produced which have unusual properties of considerable commercial importance. They are generally soluble in organic liquids and particularly petroleum products such as fuel oil and hence can be used to improve the burning characteristics of fuel oils.

Another field for the use of these compounds is in the oxidizing of organic compounds in the gaseous and especially liquid phase oxidation procedures. These vanadic esters also exhibit extreme opacity to ultra violet light and are useful as light screens in various lacquers or resinous compositions to block out undesirable short light wave radiations. They may also be incorporated into nitrocellulose and cellulose acetate sheet materials to exclude harmful light rays. Certain of the vanadic esters of the present invention have been found to be useful in paints and varnishes as driers. The improved solubility properties of these esters make them particularly useful as driers and they produce a rapid and uniform oxidation of paint and varnish coatings.

It is not necessary that the vanadic esters of the present invention be in a pure form to be useful in the various operations as pointed out above. Catalytic action and opacity to ultraviolet light is due to the vanadium itself. The compositions of the present invention therefore, may be either the ortho vanadic ester of an ether alcohol, the meta vanadic ester of an ether alcohol or other polyvanadic esters or mixtures and solutions of the various esters.

The following examples will further illustrate the present invention.

*Example 1*

An excess of technical 85% $V_2O_5$ was introduced into phenyl ether of ethylene glycol and the mixture was heated gently for about two hours in an open container. The solution assumed a yellow color which deepened to reddish brown as the boiling progressed. The solution was filtered and yielded a reddish brown solution which was found to be miscible with organic solvents. Water was added to a portion of the filtered solution whereupon the water was colored yellow indicating the presence of a vanadic acid ester.

*Example 2*

The procedure of Example 1 was followed except that the ethyl ether of ethylene glycol was substituted for the phenyl ether of ethylene glycol to produce vanadic acid esters of the ethyl ether of ethylene glycol. The reddish brown solution in this case was also miscible with organic solvents.

*Example 3*

The procedure of Example 1 was followed except that triethylene glycol was substituted for the phenyl ether of ethylene glycol to produce vanadic acid esters of triethylene glycol. A greenish brown solution was obtained which was miscible with organic solvents.

While it is apparent by the above examples that ether alcohols will react directly with vanadium pentoxide to form vanadates by simply boiling the components, other methods may also be used in some cases, such as making a vanadate of an alcohol of a suitably low boiling point and then replacing that alcohol by one of higher boiling point. This method is particularly advantageous where the vanadates of the higher boiling point ether alcohols decompose readily at the boiling point of the alcohol or where the alcohols are easily oxidized. Reactions between the higher boiling ether alcohols and $V_2O_5$ may also be advantageously carried out in the presence of a lower boiling inert solvent. In some instances the liquid in which the ester is to be used as a catalyst can serve as the reaction medium.

The esters of the present invention are usually produced in the form of a mixture of esters of ortho, meta, and higher polyvanadic acids. The proportions of the particular esters will vary with temperature, light, presence of moisture and the like. In general, high temperatures and anhydrous conditions favor the ortho, whereas lower temperatures and the presence of moisture result in a larger proportion of the meta and higher polyvanadates. Except for the fact that the polyvanadic esters are colored, whereas the ortho esters are light colored or colorless, the esters are substantially equivalent for most commercial uses, and the exact composition of a particular mixture is not usually of importance. Where it is desirable to separate the esters, this can be simply effected by suitable fractional distillation, preferably under vacuum. Another method of isolating the individual esters is by cooling and concentration. These procedures materially increase the cost of the product and for most uses the isolated esters do not produce any advantage.

While the foregoing examples relate to the production of the vanadic esters of representative ether alcohols, the present invention is not limited thereto, but includes broadly the vanadic esters of any esterifiable ether alcohol.

What I claim is:

1. The reaction products of vanadium pentoxide and ethers of ethylene glycol.
2. The tri-esters of vanadic acid and ethers of ethylene glycol.
3. The tri-esters of aryl ethers of ethylene glycol and vanadic acid.
4. The tri-esters of alkyl ethers of ethylene glycol and vanadic acid.
5. The tri-esters of polyethylene glycols and vanadic acid.
6. The vanadic acid tri-ester of triethylene glycol.
7. A vanadic acid tri-ester of the phenyl ether of ethylene glycol.
8. A vanadic acid tri-ester of the ethyl ether of ethylene glycol.

WILLIAM H. HILL.